US011288977B1

(12) United States Patent
Howard et al.

(10) Patent No.: US 11,288,977 B1
(45) Date of Patent: Mar. 29, 2022

(54) SYSTEM AND METHOD FOR PREDICTING PERFORMANCE TO CONTROL INTERVENTIONS BY ASSISTIVE TECHNOLOGIES

(71) Applicant: HRL LABORATORIES, LLC, Malibu, CA (US)

(72) Inventors: Michael D. Howard, Westlake Village, CA (US); Praveen K. Pilly, West Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 389 days.

(21) Appl. No.: 16/100,921

(22) Filed: Aug. 10, 2018

Related U.S. Application Data

(60) Provisional application No. 62/570,663, filed on Oct. 11, 2017.

(51) Int. Cl.
| G09B 19/16 | (2006.01) |
| G09B 9/052 | (2006.01) |
| G09B 9/08  | (2006.01) |
| G06N 3/08  | (2006.01) |
| G09B 19/00 | (2006.01) |
| G06N 20/00 | (2019.01) |

(52) U.S. Cl.
CPC ............ *G09B 19/167* (2013.01); *G06N 3/08* (2013.01); *G06N 20/00* (2019.01); *G09B 9/052* (2013.01); *G09B 9/08* (2013.01); *G09B 19/0069* (2013.01); *G09B 19/165* (2013.01)

(58) Field of Classification Search
CPC .... G09B 19/167; G09B 19/165; G09B 9/052; G09B 19/0069; G09B 9/08; G06N 20/00; G06N 3/08
USPC .......................................................... 434/29
See application file for complete search history.

(56) References Cited

U.S. PATENT DOCUMENTS

| 10,607,500 | B1 * | 3/2020 | Rakshit | G06F 16/9035 |
| 2012/0077158 | A1 * | 3/2012 | Jastrzembski | G09B 7/00 434/219 |
| 2013/0260357 | A1 * | 10/2013 | Reinerman-Jones | G06Q 10/1053 434/362 |
| 2016/0007899 | A1 * | 1/2016 | Durkee | A61B 5/04012 600/544 |

(Continued)

*Primary Examiner* — Michael C Grant
(74) *Attorney, Agent, or Firm* — Lewis Roca Rothgerber Christie, LLP

(57) ABSTRACT

In an embodiment of the present invention, a method for generating a prediction of ability of a subject to perform a task in a future time step includes receiving performance data corresponding to a performance of the subject on the task; receiving a plurality of biometric inputs computed based on physiological data during the performance of the subject on the task; identifying a numerical relationship between the performance data and the plurality of biometric inputs; generating a modulation parameter for each of the plurality of biometric inputs based on the identified numerical relationship; loading a plurality of state variable inputs produced by a generic model of performance; and generate the prediction of ability to perform the task at the prediction time, generated by a trained performance predictor based on biometric inputs predicted based on the modulation parameters.

16 Claims, 9 Drawing Sheets

(56) References Cited

U.S. PATENT DOCUMENTS

| | | | |
|---|---|---|---|
| 2016/0117948 A1* | 4/2016 | Kraemer | G09B 19/00 |
| | | | 434/236 |
| 2016/0239624 A1* | 8/2016 | Short | G16H 10/20 |
| 2016/0358500 A1* | 12/2016 | Schlueter | G09B 5/02 |
| 2019/0009133 A1* | 1/2019 | Mettler May | G16H 20/30 |
| 2019/0133495 A1* | 5/2019 | Mann | A61B 5/1118 |
| 2019/0216392 A1* | 7/2019 | Bower | A61B 5/0533 |

* cited by examiner

SYSTEM AND METHOD FOR PREDICTING PERFORMANCE TO CONTROL INTERVENTIONS BY ASSISTIVE TECHNOLOGIES

CROSS REFERENCE TO RELATED APPLICATIONS

This application claims the benefit of U.S. Provisional Patent Application No. 62/570,663, filed in the United States Patent and Trademark Office on Oct. 11, 2017, the entire disclosure of which is incorporated by reference herein.

STATEMENT REGARDING FEDERALLY SPONSORED RESEARCH OR DEVELOPMENT

The present invention was made with support from the United States Government under Contract No. W911NF-16-C-0018 awarded by the Defense Advanced Research Project Agency (DARPA) of the United States Department of Defense. The Government has certain rights in this invention.

BACKGROUND

1. Field

Embodiments of the present invention relate to a system and a method for predicting performance of a person on a task. Some aspects of embodiments of the present invention relate to applying the predictions of performance in the context of assistive technologies such as semiautonomous driving or flying (to decide when the driver or pilot needs help to handle a current situation), or training applications (to decide when a student has sufficiently mastered a current skill or needs more training).

2. Description of the Related Art

Various models allow for the prediction of human performance. It is difficult, however, to provide accurate predictions outside of a controlled environment, where various other factors may have an influence on an individual's performance. Such influences include the individual's various biometrics, which may alter the accuracy of a model's prediction. As such, there is a need for improved methods and systems for predicting performance.

SUMMARY

According to one embodiment of the present invention, a method for generating a prediction of ability of a subject to perform a task in a future time step includes: receiving, by a processor, performance data corresponding to a performance of the subject on the task; receiving, by the processor, a plurality of biometric inputs computed based on physiological data sensed by a first plurality of sensors coupled to the subject during the performance of the subject on the task; identifying, by the processor, a numerical relationship between the performance data and the plurality of biometric inputs; generating, by the processor, a modulation parameter for each of the plurality of biometric inputs based on the identified numerical relationship; loading, by the processor, a plurality of state variable inputs produced by a generic model of performance; preparing, by the processor, a training set, wherein the training set includes performance data, the plurality of state variable inputs, the plurality of biometric inputs, and the modulation parameter for each of the plurality of biometric inputs; receiving, by the processor: a trained performance predictor; biometric inputs predicted by following the slope and intercept of each modulation parameter to a prediction time; and cognitive model state variable predictions made by progressing the model forward to the prediction time; and generating, by the processor, the prediction of ability to perform the task at the prediction time, generated by the trained performance predictor based on the predicted biometric inputs.

Each of the plurality of state variable inputs may be indicative of a skill level of the subject for the task.

The task may be operating an aerospace vehicle.

The task may be operating a semi-autonomous vehicle.

The task may be performed on a training simulator.

The task may be a skill needed to assemble a product in a factory.

The task may be a skill needed by a soldier to quickly identify threats in an environment.

The method may further include: detecting, by the processor, that the prediction of ability to perform the task in the future time step of the subject is below a threshold; and activating, by the processor, an automated system to assist the subject in performing the task in response to determining that the prediction of ability to perform the task in the future time step is below the threshold.

The first plurality of sensors may be configured to capture environmental data sensed in a region of the subject and biometric data sensed from the subject.

The performance data and the physiological data may be captured within a plurality of time windows, each of the plurality of time windows corresponding to one of a plurality of trials involving the task.

For each of the plurality of trials, a mean may be calculated for the plurality of biometric inputs over the corresponding time window, the mean being used to identify the numerical relationship used in the training set, and used to identify the numerical relationship. The corresponding time window over which the mean is calculated may be different for each of the plurality of biometric inputs.

Each of the plurality of biometric inputs may correspond to a time window of a plurality of time windows, the time window starting before a prompt for the task is presented to the subject.

The method may further include: receiving, by a processor, a plurality of environmental sensor inputs from a second plurality of sensors, the plurality of environmental sensor inputs being captured during the performance of the subject on the task, wherein the modulation parameters encode the numerical relationship from the plurality of state variable inputs, the plurality of biometric inputs, and the plurality of environmental sensor inputs to the performance data.

According to one embodiment of the present invention, a method for predicting a performance of a subject includes: loading, by a processor, a plurality of personalized parameters, a plurality of past biometric inputs, and a plurality of past state variable inputs; generating, by the processor, a plurality of biometric inputs and a state variable input based on the plurality of past biometric inputs and the plurality of past state variable inputs; predicting, by the processor, the performance of the subject on a task based on the plurality of biometric inputs, the state variable input, and the plurality of personalized parameters; and outputting, by the processor, the predicted performance of the subject.

The method may further include: detecting, by the processor, that the predicted performance of the subject is below a threshold; and activating, by the processor, an automated system to assist the subject in performing the task in response to determining that the predicted performance is below the threshold.

The processor may predict the performance of the subject in response to a preset event.

The plurality of personalized parameters may encode a mathematical relationship from physiological data and skill to performance.

The plurality of personalized parameters may be coefficients of a polynomial.

The state variable input may be indicative of a skill level of the subject for the task.

According to one embodiment of the present invention, a system for generating a prediction of ability of a subject to perform a task in a future time step includes: a computer system comprising of one or more processors and a memory; a user input system in communication with the computer system; and a plurality of sensors configured to measure physiological data, wherein the plurality of sensors are in communication with the computer system, wherein the memory includes a non-transitory computer-readable medium having executable instructions encoded thereon, such that upon execution of the instructions, the one or more processors perform operations of: receiving, by a processor, performance data corresponding to a performance of the subject on the task; receiving, by the processor, a plurality of biometric inputs computed based on physiological data sensed by the plurality of sensors coupled to the subject during the performance of the subject on the task; identifying, by the processor, a numerical relationship between the performance data and the plurality of biometric inputs; generating, by the processor, a modulation parameter for each of the plurality of biometric inputs based on the identified numerical relationship; loading, by the processor, a plurality of state variable inputs produced by the performance data and a general model of performance; preparing, by the processor, a training set, wherein the training set includes performance data, the plurality of state variable inputs, the plurality of biometric inputs, and the modulation parameter for each of the plurality of biometric inputs; receiving, by the processor: a trained performance predictor; biometric inputs predicted by following the slope and intercept of each modulation parameter to a prediction time; and cognitive model state variable predictions made by progressing the model forward to the prediction time; and generating, by the processor, the prediction of ability to perform the task at the prediction time, generated by the trained performance predictor based on the predicted biometric inputs.

The plurality of sensors may sense physiological data during the performance of the subject on the task.

The plurality of sensors may sense and may detect data from an environment during the performance of the subject on the task.

According to one embodiment of the present invention, a non-transitory computer readable medium contains program instructions that, when executed by a processor, cause the processor to generate a prediction of ability of a subject to perform a task in a future time step by: receiving, by a processor, performance data corresponding to a performance of the subject on the task; receiving, by the processor, a plurality of biometric inputs computed based on physiological data sensed by a first plurality of sensors coupled to the subject during the performance of the subject on the task; identifying, by the processor, a numerical relationship between the performance data and the plurality of biometric inputs; generating, by the processor, a modulation parameter for each of the plurality of biometric inputs based on the identified numerical relationship; loading, by the processor, a plurality of state variable inputs produced by the performance data and a general model of performance; preparing, by the processor, a training set, wherein the training set includes performance data, the plurality of state variable inputs, the plurality of biometric inputs, and the modulation parameter for each of the plurality of biometric inputs; receiving, by the processor: a trained performance predictor; biometric inputs predicted by following the slope and intercept of each modulation parameter to a prediction time; and cognitive model state variable predictions made by progressing the model forward to the prediction time; and generating, by the processor, the prediction of ability to perform the task at the prediction time, generated by the trained performance predictor based on the predicted biometric inputs.

BRIEF DESCRIPTION OF THE DRAWINGS

Example embodiments of the present invention will now be described more fully hereinafter with reference to the accompanying drawings, wherein.

DETAILED DESCRIPTION

Figure 1:
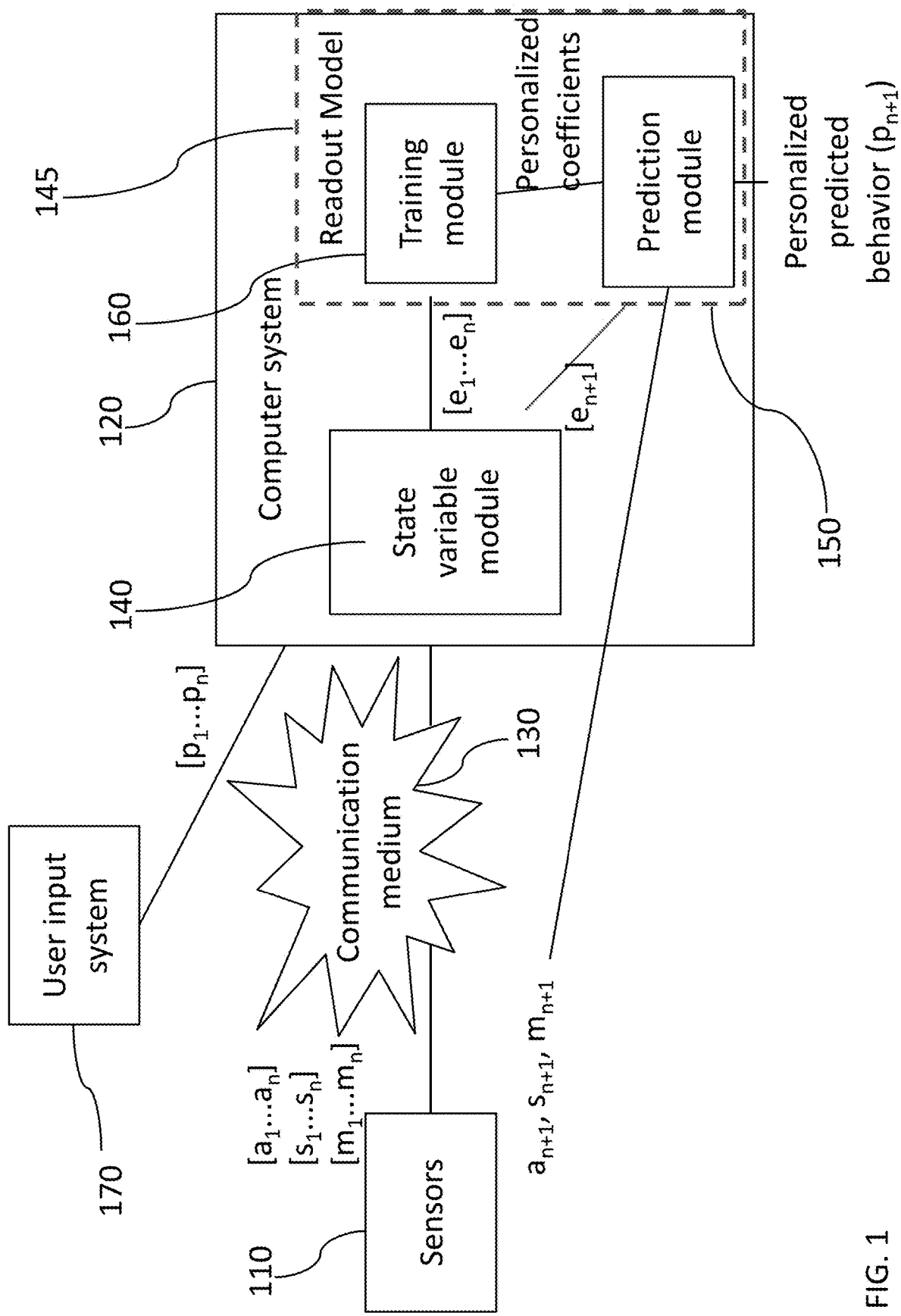
FIG. 1 is a block diagram of a system for predicting performance in accordance with an embodiment of the present invention.

Embodiments of the present invention will now be described with reference to the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated.

When a certain embodiment may be implemented differently, a specific process order may be performed differently from the described order. For example, two consecutively described processes may be performed substantially at the same time or performed in an order opposite to the described order.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having meanings that are consistent with their meanings in the context of the relevant art and/or the present specification, and should not be interpreted in an idealized or overly formal sense, unless expressly so defined herein.

Aspects of embodiments of the present invention are directed to a performance prediction system, such as predicting a subject's performance on a task while the subject is learning a skill. While existing models may predict performance based on various data inputs, such as past performance, such models are general, and do not provide predictions that are tailored to a subject's distinct behavioral patterns. The degree to which a factor influences performance may vary from person to person. For example, the baseline for various biometrics may vary (e.g., resting heart rate varies with fitness level). Different factors may have different effects on different people, and these differences may vary further depending on a combination of other factors. For example, a subject whose biometrics show a relatively high level of cognitive activity may do well on a task. However, the subject may not do well when the subject's biometrics also show a level of stress beyond a certain personal threshold. As another example, one subject may be distracted by certain environmental conditions more than another subject, and thus their performance might be disproportionately degraded when such environmental conditions exist. As such, models for predicting performance can be improved by personalizing the model for each individual.

Aspects of embodiments of the present invention are directed to generating a personalized prediction of ability of a subject to perform a task in a future time step. Such personalized performance predictions have a variety of uses. Personalized performance predictions can be incorporated into a monitoring system to predict performance of a subject. A car may include a safety system that monitors the driver and/or the environment and predicts when a driver may need assistance maneuvering the car (i.e., the safety system predicts the driver's performance). For example, the driver who is distracted or incapacitated may not react in time to avoid an object on the road, and a semi-autonomous driving system would need to predict the drivers future performance, which may trigger the need for automated assistance to take over driving and avoid collision. Personalized performance predictions can also be used by an automated training system to determine when a subject has adequately learned a new skill (e.g., operating an aircraft or learning a new language) or reached a certain skill level (e.g., memorizing the capital of each U.S. state) by predicting future performance of the trained skill. Based on a desired skill level (e.g. a normalized level of performance) the training system can be controlled to either present more training in a certain skill or to move on to a new skill to be trained.

FIG. 1 is a block diagram of a system for predicting performance in accordance with one embodiment of the present invention. The system includes a plurality of sensors 110, a computer system 120, a communication medium 130, and a user input system 170. The sensors 110 may detect a subject's physiological data, such as eye movement (e.g., through electrooculography (EOG)), electrical activity of the brain (e.g., through electroencephalography (EEG)), electrical activity of muscle tissue (e.g., through electromyography (EMG)), electrical activity of the heart (e.g., through electrocardiography (EKG or ECG)), and skin conductance level (e.g., through an electrodermal activity meter). Such physiological data may be used to calculate biometrics or characteristics such as stress, attention, mental fatigue, and emotion. For example, EEG and EMG data can be used to calculate a numerical biometric representing the subject's attention level, EEG data can be used to calculate a biometric for mental fatigue, and ECG data can be used to calculate a biometric for stress. According to one embodiment, the sensors 110 may further detect data from the environment, such as temperature, humidity, atmospheric pressure, sound, visual data, and haptic data. Sensor data may be collected when a subject performs a task, before the subject performs a task, and/or after the subject performs a task. The sensors 110 may be coupled to the computer system 120 to provide sensor data to the computer system 120 over the communication medium 130. The communication medium 130 may be a local area network (LAN), private wide area network (WAN), the Internet, or any wired or wireless network environment conventional in the art. Alternatively, the sensor data may be provided to the computer system 120 from other sources, such as the "Cloud." The sensors 110 may provide the sensor data to other sources (e.g., the "Cloud"), where the sensor data may be stored on a server until a later time, when the data is provided to the computer system 120. In one embodiment, the sensor data may be provided to other sources for processing before the data is provided to the computer system 120. For example, the other sources may convert the sensor data to a different metric or different units (e.g., from inches to centimeters) or use the sensor data to generate other data (e.g., generate biometrics using EEG data or generate heart rate variability using a number of heartbeats detected and the length of time over which the heartbeats are detected). In some embodiments, the computer system 120 may compute biometrics from sensor data after the computer system 120 receives sensor data. The sensor data may be time-stamped with the time of detection before the data is received by the computer system 120, or the computer system 120 may time-stamp the sensor data when the computer system 120 receives the sensor data. The computer system 120 may store the sensor data after the sensor data is received. Likewise, the biometric data may also be time-stamped in accordance with the time or time ranges (or windows) of the sensor data used to compute the biometric data.

The computer system 120 executes software instructions and interacts with components of the system to perform the instructions of the present invention. In one embodiment, a number of software objects or modules may reside in the computer system 120, including a state variable module 140, a training module 160, and a prediction module 150. Although these modules are assumed to be separate functional units, a person of skill in the art will recognize that the functionality of the modules may be combined or integrated into a single module, or further subdivided into further sub-modules, without departing from the spirit of the invention. In addition, in some embodiments, the various modules may be implemented by different physical hardware computer systems. For example, the training module 160 may be implemented in the cloud, e.g., by a server computer that may receive training data over a communication medium 130 such as the Internet or other communications network, and transmit the personalized coefficients and statistics over the communication medium 130 to the prediction module.

According to one embodiment, the state variable module 140 is configured to assess a subject's skill level (ability) based on a subject's performance data (e.g., for a task, or a skill) and a general model of biophysical and/or neurocognitive human behavioral performance. A task may be a cognitive task, such as the recollection of a memory, the completion of a math problem, or the identification of an item; a physical task, such as the operation of a tool or assembly of a product in a factory; or a combination that requires both cognitive and physical engagement. A task may involve navigating through a virtual environment or a real environment using a car or an airplane (or other aerospace vehicle); operating a semi-autonomous vehicle; learning skills on a training simulator; identifying or classifying objects such as airplanes or land vehicles; or recalling, defining, or translating new terms, such as terms in a foreign language or nomenclature of a particular field. Some aspects of embodiments of the present invention involve tasks needed by soldiers to quickly identify threats in an environment (e.g., identifying likely positions on enemy soldiers, identifying likely locations of explosives, and determining tactics and patterns used by enemy soldiers). A general model of human behavioral performance may be used to determine a subject's skill level by evaluating a subject's performance in a variety of tasks and/or skills.

A subject's skill level may be represented by a numerical value reflecting the subject's ability to perform the task. A subject's performance data may include information concerning predetermined performance attributes. For example, a subject's performance data may indicate whether a subject correctly answered a question, the amount of time required for a subject to correctly answer a question, the amount of time required for a subject to physically react to a stimulus, and/or the amount of time required for a subject to pick up an object using a tool. In response to receiving the performance data, the state variable module 140 assesses the subject's skill level (ability) based on the subject's performance (e.g., response time). The state variable module 140 may assess the subject's skill level according to a general model of human performance. Examples of such a general model are disclosed, for example, in U.S. Provisional Application Nos. 62/410,533 (titled CLOSED-LOOP MODEL-BASED CONTROLLER FOR ACCELERATING MEMORY AND SKILL ACQUISITION) and 62/440,820 (titled CLOSED-LOOP INTERVENTION CONTROL SYSTEM), the entire disclosures of which are incorporated herein by reference. For example, in a memory task, the subject may recall a memory in 10 seconds in a first trial, recall a memory in 15 seconds in a second trial, and recall a memory in 8 seconds in a third trial. The state variable module 140 may determine that the subject's skill level in the first trial is 0.75, that the subject's skill level in the second trial is 0.65, and that the subject's skill level in the third trial is 0.8. The subject's skill level may be used to predict the subject's future performance (e.g., whether the subject will correctly answer a question in a future trial, the subject's future response time after more training, and/or when the subject will reach a target level of performance).

Figure 2B:
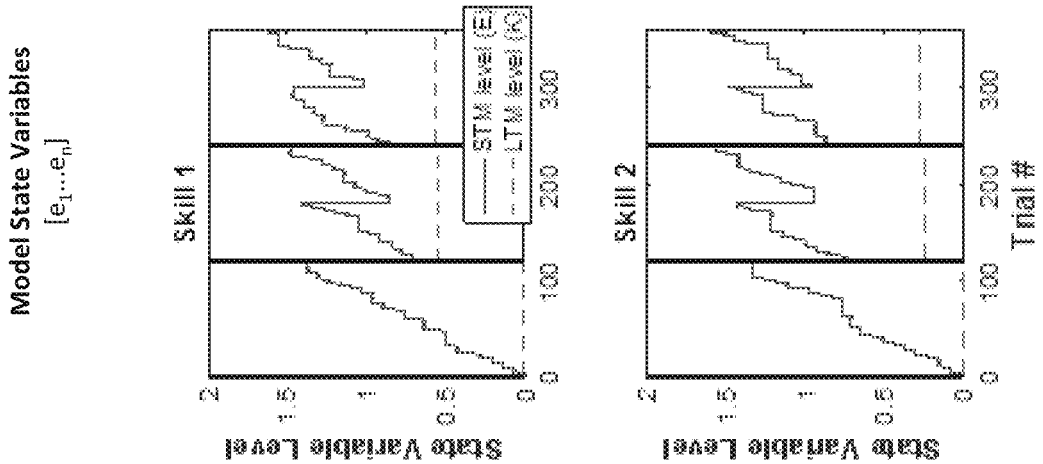
FIG. 2B is an example showing a plurality of state variables generated by an embodiment of the present invention.
Figure 2A:
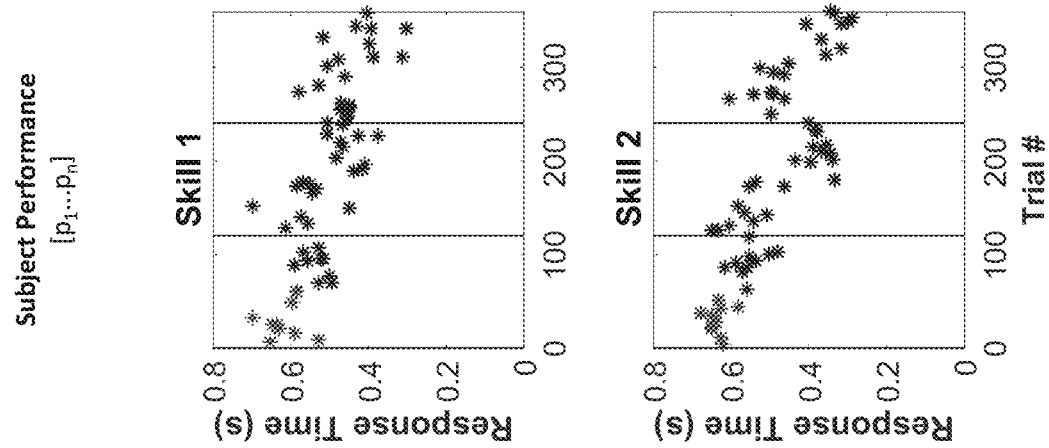
FIG. 2A is an example showing subject performance data generated by an embodiment of the present invention.

FIG. 2A is an exemplary plot of subject performance data (response time) for two skills (Skill 1 and Skill 2) over a period of three days according to one exemplary embodiment. For each trial, a subject may be required to complete the same task (e.g., spell the same word) or complete variations of a task (e.g., complete similar but different math problems). Performance data may include data collected during training (e.g., when a subject is learning a task) and/or data collected during testing (e.g., when a subject is being tested to assess how well the subject learned a task). FIG. 2B is an exemplary plot of state variables generated by the state variable module 140 using the subject's performance data according to one exemplary embodiment. The state variables may represent the subject's skill level or cognitive state. As such, a plot of the state variables may illustrate a subject's progress as the subject learns a task or a skill. The example in FIG. 2B plots state variables for both short-term memory (STM) and long-term memory (LTM) over time (trial number). The state variable module 140 may include a general human behavioral performance model or cognitive model that models a subject's cognitive or mental state by simulating how the brain encodes and stores data in short-term and long-term storage (memory), and how these representations change over time, and may incorporate cognitive changes that result from sleep, such as memory consolidation. The cognitive model may be computed, in part, by customizing a generic model based on the subject's performance data. In such a model, the state variable level for short-term memory may increase as additional trials are completed within the same day, which may indicate a strengthening of a memory as a subject completes additional trials. However, the state variable level for long-term memory may remain relatively constant until the following day, when a higher value of the long-term memory state variable may indicate that consolidation into long-term memory occurred during sleep.

While the mental state of the subject may be used as a predictor of performance, as noted above, the cognitive model in some related work is a generic model of memory encoding, decay, and consolidation, which may fail to capture personalized characteristics of the subject's behavior. As such, in embodiments of the present invention, biometric data computed from measurements personal to the subject are used to refine performance predictions, as described in more detail below.

Returning to FIG. 1, the model used by the state variable module 140 to map the subject's observed performance to a skill level may be trained on data from a group of individuals and/or trained on the subject's individual data.

In one embodiment, the performance data may be inputted into the computer system 120 via the user input system 170. The performance data may also be computed based on raw subject responses (or raw input data from the subject) provided via the user input system 170. The user input system 170 may include a mouse, a keyboard, and/or any type of interface that may allow for the input of performance data into the computer system 120. In one embodiment, the user input system 170 may be a user input device, such as a mouse or a keyboard. Alternatively, the user input system 170 may provide performance data to the computer system 120 over the communication medium 130. In one embodiment, the performance data may be provided from other sources, such as the "Cloud" or other sensors monitoring performance. In some embodiments, the user input system 170 receives user inputs corresponding to the subject's performance of a task. For example, in a system configured to observe a subject's performance in learning a foreign language, the user input system 170 may receive the subject's responses to questions (e.g., the subject's translation of words) that may be shown on a display panel coupled to the user input system 170. The user input system 170 may provide the performance data to the "Cloud," where performance data may be stored on a server until a later time when the data is provided to the computer system 120. In one embodiment, the performance data may be provided to the "Cloud" for processing before the data is provided to the computer system 120. For example, performance data may be converted to a different metric (e.g., from seconds to milliseconds) or used to generate additional performance data (e.g., a ratio of correct answers over incorrect answers). The user input system 170 may time-stamp the performance data with the time of capture before the data is provided to the computer system 120, or the computer system 120 may time-stamp the performance data when the computer system 120 receives the performance data. The computer system 120 may store the performance data after the performance data is received.

In the Readout Model 145, the training module 160 is configured to provide personalized parameters that are later used by the prediction module 150 to make personalized predictions of performance. The training module 160 may use the subject's performance data, the subject's skill level generated by the state variable module 140, and biometric inputs to generate the personalized parameters. By processing performance data alongside biometrics and/or data from the environment, the system is able to determine the relationship, if any, between a subject's performance of a task and subject's biometrics.

In the Readout Model 145, the prediction module 150 is configured to provide a personalized prediction of a subject's performance. The prediction module 150 may use the subject skill level generated by the state variable module 140, personalized parameters generated by the training module 160, and biometrics to provide a personalized prediction of a subject's performance. According to one embodiment, the prediction module's 150 prediction may further be used to determine whether a subject has reached a target skill level, or requires more training.

Figure 3:
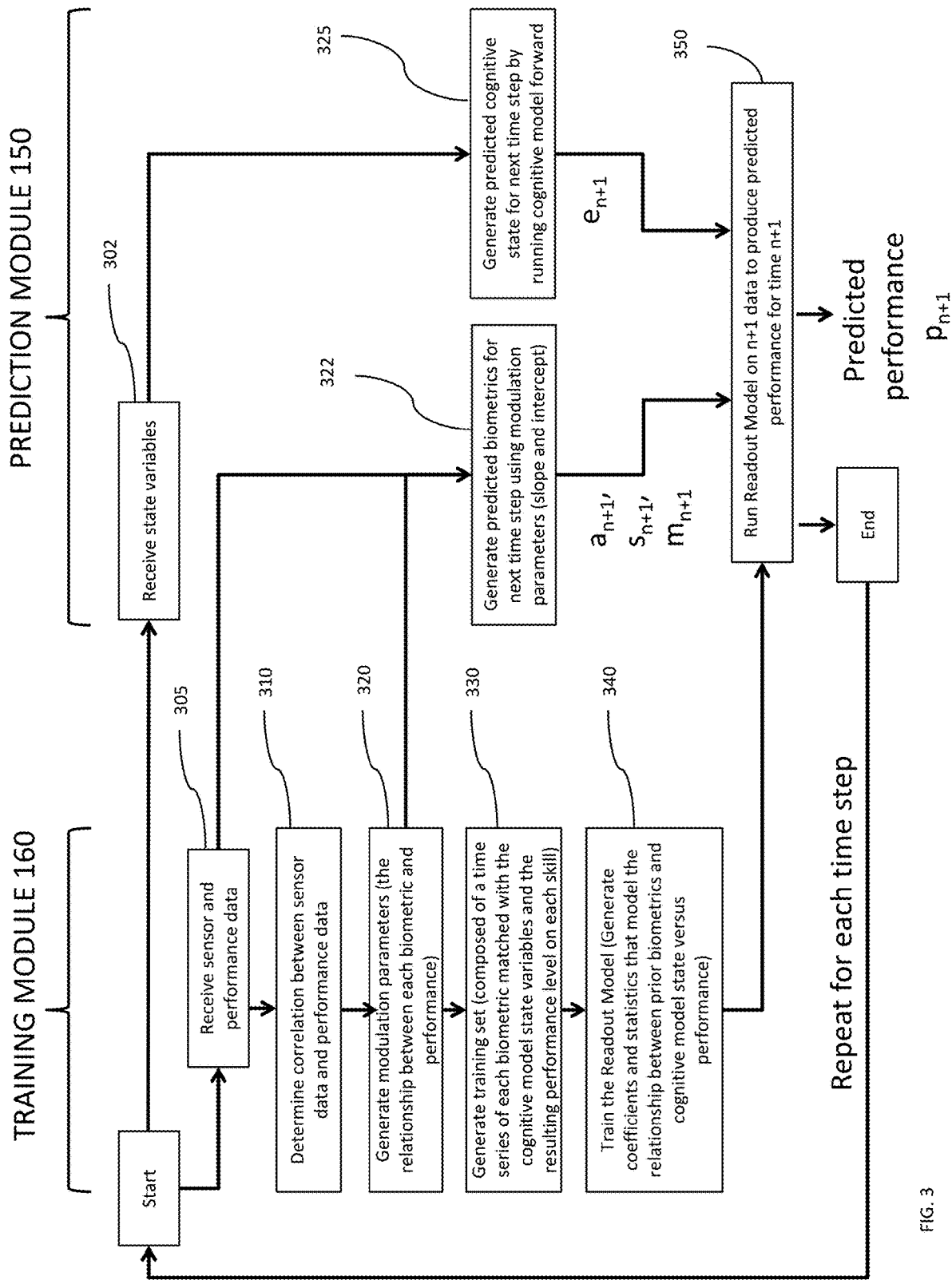
FIG. 3 is a process flow chart depicting operations for processing biometric data, performance data, and a plurality of state variables to generate a plurality of personalized coefficients and statistics (a trained "Readout Model") for personalized performance predictions tailored to the subject (a "Training module"), and then producing predicted environmental variables and predicted state variables, and presenting them to the Readout Model to produce a predicted level of performance (the "Prediction module") in accordance with an embodiment of the present invention.

FIG. 3 is a process flow chart depicting the Readout Model's 145 operations for processing biometric data, performance data, and subject skill level to generate a prediction of ability of a subject to perform a task in accordance with an embodiment of the present invention. The Readout Model 145 may also be referred to herein as a "trained performance predictor". The process starts, and in operation 302 the prediction module 150 receives state variables, and the training module 160 receives biometric data and/or environmental data and performance data in operation 305. In operation 310, the training module 160 processes the performance data and the biometric data and/or environmental data for a trial to determine whether there is a significant correlation between the performance data and biometric data and/or environmental data. Systems and methods for computing biometrics such as stress, attention, and mental fatigue from physiological measurements such as EEG, ECG, pulse, and the like are described in U.S. patent application Ser. No. 15/944,530, filed in the United States Patent and Trademark Office on Apr. 3, 2018, now issued as U.S. Pat. No. 10,877,444 the entire disclosure of which is incorporated herein by reference herein. These methods are related to ones in the literature, such as a method of computing mental fatigue (described in Trejo, Leonard J., et al. "EEG-based estimation and classification of mental fatigue." *Psychology* 6.05 (2015): 572); a method of computing attention using a theta/beta ratio (described in Putnam, Peter et al. "EEG theta/beta ratio as a potential biomarker for attentional control and resilience against deleterious effects of stress on attention." *Cognitive, Affective, & Behavioral Neuroscience* 14.2 (2014): 782-791); and a method of computing stress as a heart rate variability measure (described in (Healey, J. A., and Picard, R. W. "Detecting stress during real-world driving tasks using physiological sensors." *IEEE Transactions on intelligent transportation systems* 6.2 (2005): 156-166). The training module 160 may determine whether there is a significant correlation between performance data and each biometric input for each trial. For example, in the case that the collected sensor data is used to compute biometrics representing stress, attention, and mental fatigue during each trial, the training module 160 may determine whether there is a correlation between performance and stress, whether there is a correlation between performance and attention, and whether there is a correlation between performance and mental fatigue. This is important for two reasons. First, it is possible that a biometric or environmental variable (e.g., whether it is day or night) has nothing to do with performance on the task. In that case the variable is removed from the subsequent mathematical relationship. Second, if there is a correlation, then the biometric or environmental variable is modulated by the slope of the relationship. This means, for example, that a variable that is correlated positively with performance is given a strengthening effect on the performance prediction, and one with negative correlation is given a degrading effect on the performance prediction.

In more detail, for each trial, the training module 160 may determine whether there is a significant correlation between performance data and a mean of the biometric data for that biometric (e.g., stress) for that trial. The mean may be the average computed over a portion of the trial, over the entire trial, or over a window of time that includes both time during the trial and time outside of the trial (e.g., time before and/or after the trial). The length of the time window may vary depending on the biometric being measured and/or vary depending on the task. For example, in a trial involving a physical task, a mean for mental fatigue may be taken over a window that includes a period of ten minutes before a prompt is presented to the subject. In contrast, a time window used to calculate a mean for EEG data in a cognitive task may not exceed two seconds before a prompt is presented to the subject, because data exceeding two seconds likely will not be strongly correlated to the subject's performance.

Figure 4A:
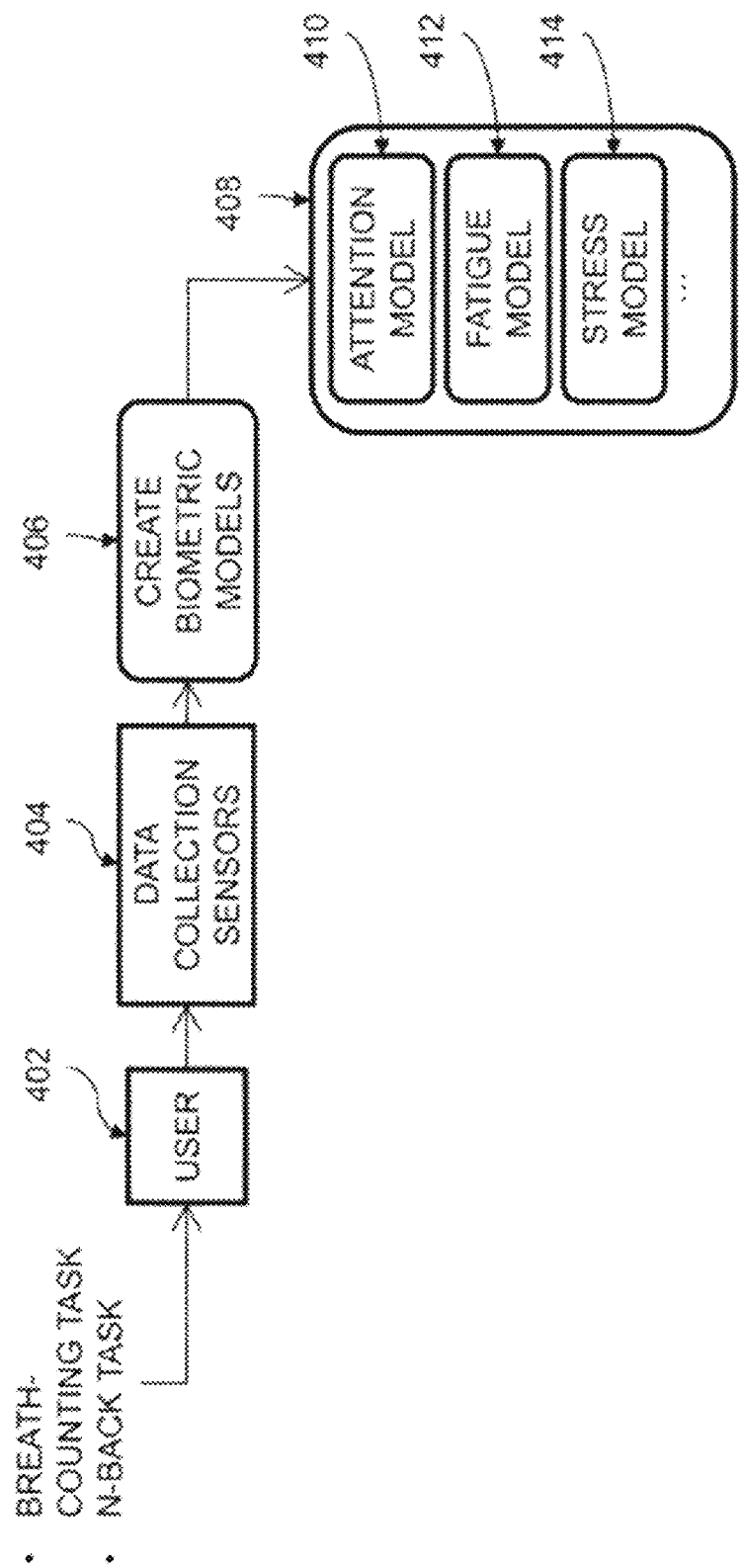
FIGS. 4A and 4B are system diagrams, according to some embodiments.
Figure 4B:
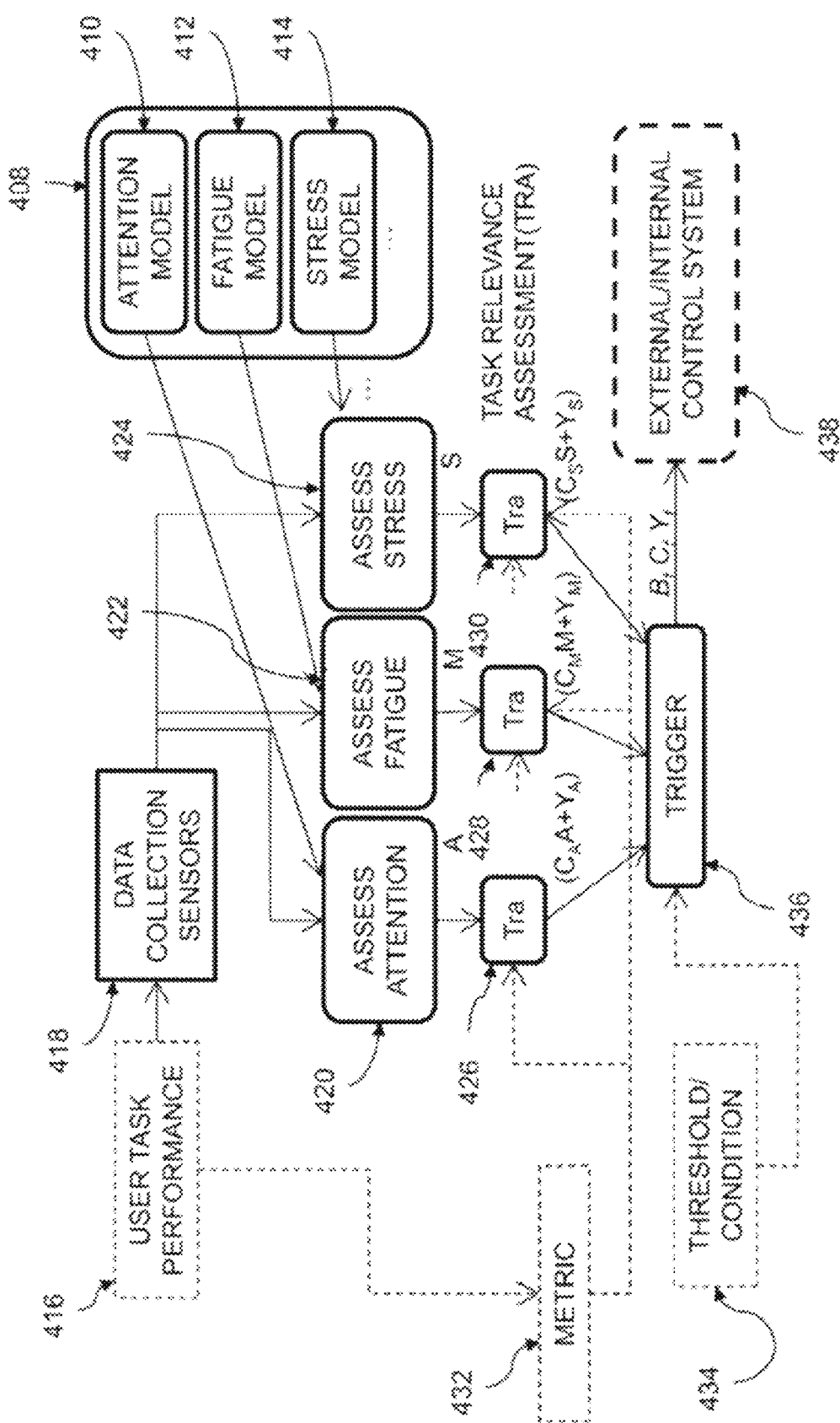

FIGS. 4A and 4B are system diagrams, according to some embodiments, and their operations are described in the following paragraphs and subsequent sections.

As shown in FIG. 4A, in some embodiments, before the actual relevant task begins, the user 402 (e.g., a subject, a person whose data is being provided, etc.) may perform one or both of two tasks (e.g., evaluation tasks; calibration tasks): breath counting and N-back. The data from these evaluation tasks may be used to train a set of biometric models 408. The breath counting and N-back tasks are described in further detail below.

Data collection sensors 404 (e.g., sensors 110, EEG, EMG, GSR, Resp, ECG data, or other biofeedback related sensors) collect data from the user 402 (e.g., during performance of the two tasks, during simulated, test, or practice versions of the actual relevant task). The data collection sensors 404 may include multiple sensors, such as first, second, and third biometric sensors that are used to collect first, second, and third biometric data, respectively. Additional or fewer sensors may be used to collect correspondingly greater or fewer types of sensor data.

Based on the data collected from the data collection sensors 404 during performance of one or more evaluation tasks, in operation 406, the system may create one or more biometric models 408 (e.g., first, second, or third biometric models) for each biometric (e.g., using a model creation module). For example, an attention model 410, a fatigue model 412, and a stress model 414 may be created.

In operation 406, a model 408 may be created by machine learning algorithms (known to those skilled in the art) that take a set of labeled data as input and finds parameters that can reproduce the data. The procedure for validating the classification accuracy may include dividing the data into a training set and a test set, where the training set is labeled and after training, and testing the model by supplying unlabeled test data and getting the model's predictions of what the labels should be for the test data.

For situations where discrete classification is a sufficient characterization, the following models might be used: linear discriminant analysis (LDA), and support vector machine (SVM). Where discrete classification is not a sufficient output, regression can be considered with the following models: linear regression, epsilon-support vector regression (SVR), and generalized linear model (GLM) using a binomial distribution and a logit link function.

For some embodiments, to evaluate the discrete classification models, standard k-fold cross-validation may be used to assess the classification accuracy of each feature set for mental state components (e.g., stress, mental fatigue, attention, etc.). Data may be separated into 10 partitions and permuted exhaustively with 9 partitions used for training and one partition for testing. Each partition may contain an equal number of samples per class, and a uniform prior may be utilized. Each channel may be evaluated independently, and results may be averaged across channels per subject. To evaluate the regression models, each model may be trained on the same data utilized for the best feature sets determined from the k-fold validation process for mental fatigue and stress. Leave-one-out cross-validation can provide bounds for the each biometric. Data from the 1-back recall task (with expected intermediate values) may serve to evaluate whether a continuous mapping was learned for the given biometric even if it is not utilized for training. The 1-back data may be rated somewhere between the relaxing breath-counting task and the more stressful and fatiguing 3-back task.

Although this description focuses on attention, mental fatigue, and stress, it would be straightforward for one skilled in the art to add other metrics (e.g., physical fatigue, emotions such as anger, depression, fear, happiness) into the framework described here. Once the models are created and when the relevant task begins, biometrics may be assessed as frequently as is practical given the processing speed and as is useful for user performance analysis. Biometrics like heart rate variability may change drastically in a second. Standard EEG systems take measurements many times a second (500 Hz for Neuroelectrics system), and again these can change drastically in that time. For these reasons, some embodiments take a rolling mean of the data, and that provides trends that are useful.

As shown in FIG. 4B, after the biometric models 408 are trained, they are ready for use in association with the actual relevant task 416. At each timestep, an assessment process (e.g. Assess Attention 420, Assess Fatigue 422, and Assess Stress 424) produces a value for each biometric (e.g., first, second, or third biometric values) based on inputs, such as the data 418 from the user task performance 416, and from the trained biometric models 408 (e.g., the attention model 410, the fatigue model 412, the stress model 414). The mental state (e.g., the mental state score) may be calculated from the biometric values (e.g., for attention, mental fatigue, stress). Other embodiments may use different and/or additional biometric values. [0051.10] In example operations, EEG and ECG were collected from all participants using a 32-channel Neuroelectrics StarStim32 EEG system (e.g., data collection sensors 418) sampled at 500~ Hz. Each channel included data from a single electrode. This data was pre-processed with automatic channel rejection, 59-61~ Hz band stop and 0.1~ Hz high pass filtering, DC offset removal, and average re-referencing using EEGlab functions. EEG quality was assessed using the Signal Quality Index (SQI) metric.

The Independent Components (ICs) were ranked as candidate noise components by their correlation with nuisance signals (e.g., accelerometer, EOG, ECG, etc, and ICs with delta SQI<−0.001 were removed). Channels rejected due to these considerations were replaced by interpolating nearby channel data, followed by moving average subtraction with a window of 1000 samples for EEG and 50 samples for ECG. A Fast Fourier Transform was applied to the time series data to extract spectral power from discrete 10 s bins. Classifiers (e.g., the Models 408, the Attention Model 410, the Fatigue Model 412, the Stress Model 414) were then trained on these data for each electrode (e.g., data collection sensors 418) separately to compute the attention, fatigue, and stress biometrics. The final classifications (e.g., the outputs of 420, 422, 424 after applying the 408 models to the multi-channel data from the sensors 418) were averaged from predictions across the electrodes.

The inputs for the assessment process may further include data collected from data collection sensors 418 (e.g., the same or different sensors as the sensors 404 that were used to create biometric models 408). Sensors 404 may differ from the sensors 418 for various reasons, such as if the models are created some time before and at different locations from where the user task performance 416 occurs. The performance of the system may be improved if the sensors 404 and the sensors 418 are the same.

As each biometric value is computed, it is added to a temporal vector of values and passed to a task relevance assessment (TRA) process (e.g., TRA 426, TRA 428, TRA 430) along with one or more metrics 432 on task performance to determine relevance (e.g., a first, second, or third relevance). An external or internal system (not part of some embodiments of the system and method) may supply such metrics 432 on task performance, and the type of metrics 432 may depend on the type of user task being performed (e.g., information from user task performance 416 is used to determine the metric 432). In various embodiments, performance of a task is dependent on a task. For example, a threat detection task might be evaluated on whether a person correctly recognized threats in novel images. In the case of driving, performance may be assessed based on whether a driver is safely operating a vehicle.

In some embodiments, the trigger 436 system evaluates the current mental state variable assessments and the output of the task relevance assessment processes with respect to one or more threshold/conditions 434. Based on that evaluation, data, instructions, and/or recommendations may be provided by the trigger 436 system to the external/internal system 438, enabling it to make informed interventions such as alerting the user, activating safety systems, taking over automated control of a vehicle or other system, etc. As illustrated, trigger 436 has a solid outline representing that for some embodiments, it is part of the system. User task performance 416, metric 432, threshold/condition 434, and external/internal control system 438 are shown in dotted lines to represent that they are not part of the system in the illustration.

For example, user task performance 416 may be performed by a user or subject that is monitored by the system, but who is not actually part of the system. The dashed line from user task performance 416 to metric 432 is used to indicate that the metric 432 may be based on the type of task performed, but that the determination may be performed outside of the system. In other embodiments, the determination of what metric to use based on what task is being performed may be part of the system.

The metric 432 and the threshold/condition 434 may include data that is provided by an external source that is not part of the system, but it may be included as part of the system in other embodiments. The dashed lines from metric 432 and the threshold/condition 434 thus represent information that come from outside the system, but which could be part of the system in some embodiments.

Although not necessarily part of the system as illustrated in FIG. 4B, the external/internal control system 438 may in some embodiments be included as part of the system.

In some embodiments, the threshold/condition 434 is based on one or more variables or parameters may include a sensor output, a rate of change for a variable, or a ratio of a first parameter relative to one or more other parameters, etc. The threshold or condition 434 may be a value that, once crossed, requires performance of an action. Another example condition may involve detection of a parameter within a range of values for a sufficient period of time. Other example conditions may include an output of an equation or formula, a ratio based on one or more parameters that crosses a threshold or falls within a range of values.

If an assessment activates (e.g., meets or violates, satisfies or does not satisfy) the threshold/condition 434, the trigger 436 may report the metric together with its relevance assessment, or the trigger 436 may otherwise cause an action to be performed by a device 604 (e.g., through direct control of a device 604, using the external/internal control system 438 to control the device 604). In some embodiments, the output of the trigger 436 is used by the external/internal system 438 to make performance predictions and to decide how to act based on that information.

Although this description refers to first, second, and third types of sensors, biometric data, biometric values, relevance, and biometric models, additional or fewer types of each may also be used in various embodiments.

Figure 5:
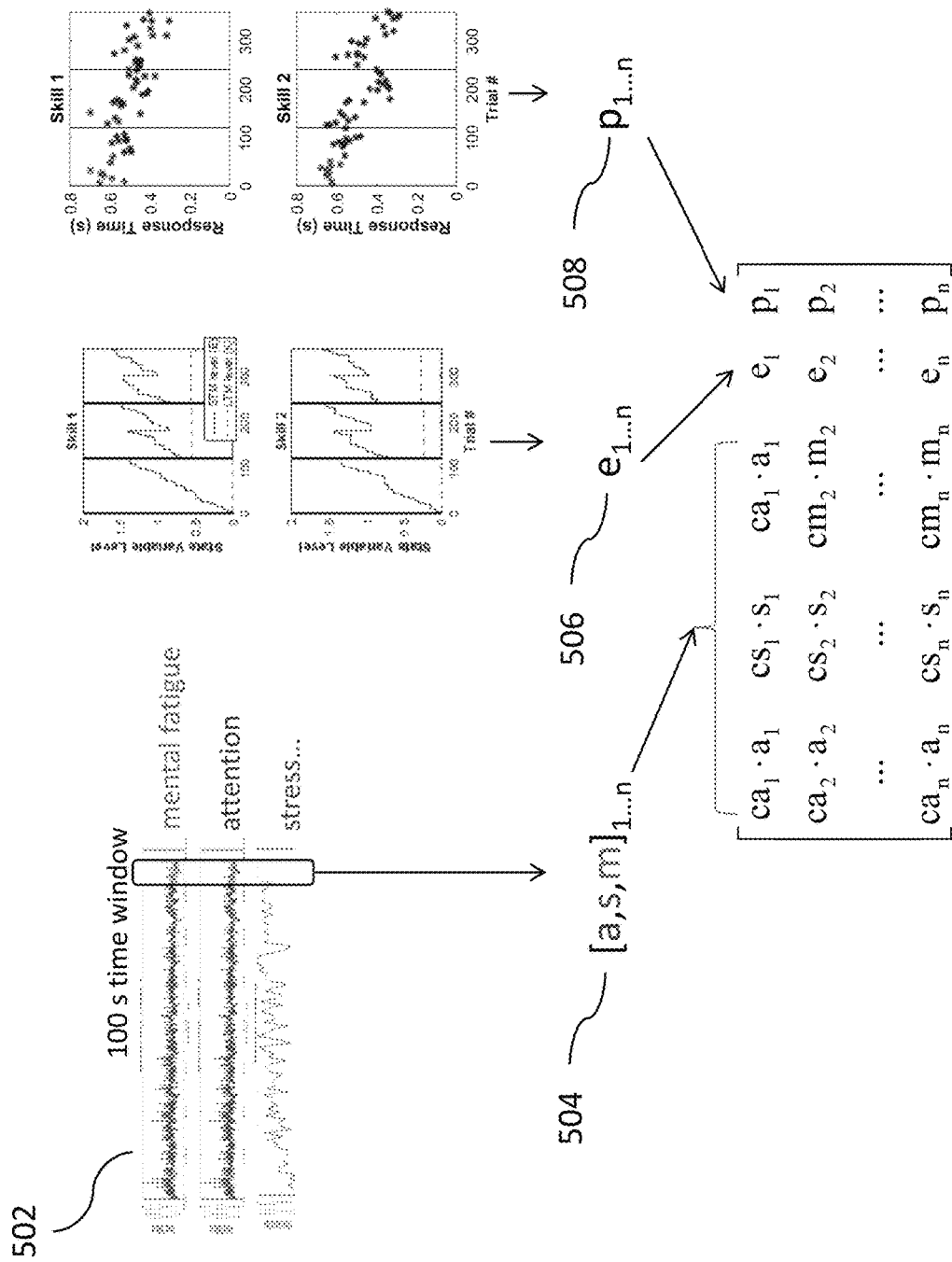
FIG. 5 is a process flow chart for predicting performance in accordance with an embodiment of the present invention.

FIG. 5 is an example showing biometric data 502 representing mental fatigue, attention, and stress for n number of trials. An aggregate value (such as a mean) 504 for each of these biometrics (mental fatigue m, attention a, and stress s) may be computed for each trial over a time window (e.g., a 100 second time window).

Returning to FIG. 3, the training module 160 may determine whether there is a numerical relationship between performance data and biometric data (e.g., a mean of the biometric data for that biometric type for that trial) by first determining whether the numerical relationship is significant using a method such as a "p-value" known widely as a statistical measure of significance (e.g., Goodman, Steven. "A dirty dozen: twelve p-value misconceptions." Seminars in hematology. Vol. 45. No. 3. W B Saunders, 2008). The p-value is a number between 0 and 1, inclusive, and if it is less than 0.05, we consider that the biometric and/or environmental value is significantly related to the performance. The training module 160 may generate a p-value for each biometric and/or environmental variable.

In operation 320, the training module 160 generates a modulation parameter for each biometric input (e.g., a, s, and m) for each trial (e.g., 1 through n). For example, a subject may complete five trials and biometric data for attention, mental fatigue, and stress may be calculated for each of these trials. The training module 160 would generate 15 modulation parameters—three modulation parameters for each of the five trials.

The training module 160 may generate modulation parameters based on the p-value that was produced in operation 310 for each biometric input for each corresponding trial. The training module 160 may generate a modulation parameter having a value of 0 when the corresponding p-value is 0.05 or higher. When the p-value is less than 0.05, the training module 160 may run a first order regression fit using a polynomial curve fitting function that fits a line to the relationship between the input and the performance over the time window, and sets the modulation parameter for the corresponding biometric and/or environmental input to the slope of the fit. When the training module 160 runs a first order regression fit, the training module 160 may use biometric data of the same type (e.g., mental fatigue m) from previous and/or future trials involving the same subject and the same task. For example, the training module 160 may use data from trials completed by the subject during the same session and may also use data from trials completed on other days. This allows the training module 160 to generate a regression fit that is similar to a least-fit line through the trial data, where each data point has a biometric data value on the x-axis and a performance value on the y-axis. The slope of the regression line is used as the modulation parameter for the corresponding biometric input data point. The modulation parameter indicates the relationship between performance data and biometric data. If the slope is positive, this indicates that higher values of the biometric are related to higher values of performance. If the slope is negative, the biometric is inversely related to performance.

In operation 330, the training module 160 generates a training set. The training set may be generated after modulation parameters for each trial have been determined.

FIG. 3 also shows an exemplary prediction module that makes predictions based on the training set generated by the training module in an embodiment of the invention. The training set includes the biophysical and/or cognitive model state variable 302 for each trial (e.g., e1 through $e_n$, read from the state variable model, where the state variables may be scalars or vectors), and the mean of the biometric and performance data 305 for each biometric type (e.g., attention a, stress s, and mental fatigue m) for each trial multiplied by the corresponding modulation parameter (e.g., c). The state variable e 302 is the subject skill level generated by the state variable module 140 for the corresponding trial. The state variable module 140 may generate the state variable after performance data is received by the computer system 120. The mean of each biometric data type may be the mean that was used by the training module 160 to determine whether there is a correlation between performance data and biometric data. The training set also includes a vector of the subject's performance data 305 for each trial (e.g., $p_1$ through $p_n$).

Further, in FIG. 3, the biometric data may have been scaled to a range of 0 to 2 before the data was provided to the computer system 120, or the computer system 120 may have scaled the biometric data after it received the data. For the training set, the training module 160 may adjust the biometric data to a range of −1 to 1 by subtracting 1 from each biometric input. In addition, biometric data that did not have a significant correlation with performance data, which is associated with a modulation parameter (c) of 0, do not have an influence in the training set. In operation 340, the training module 160 generates correlation coefficients and statistics by processing the training set for each corresponding trial. The training module 160 may use any regression model (e.g., a generalized linear model (GLM) function, such as those described in J N and R. W. M. Wedderburn, "Generalized Linear Models", *J. R. Statist. Soc. A,* 135 (1972) 370-384) to compute a set of coefficients that best fits the state variables and the biometric data means onto the observed performance vector. As would be understood by one of skill in the art, the generalized linear model may include a link function, which provides the relationship between the linear predictions of the GLM with the distribution of the performance vector, where different types of link functions may be used for performance vectors having different distributions (e.g., the identity link function for a normal distribution, a log link function for a Poisson distribution, and logit link function for a binomial distribution). The training module 160 may not be limited to using GLM and may use another machine learning model that is capable of mapping between two data domains, such as a neural network. In operation 350, the training module 160 may output the set of correlation coefficients and statistics, which represent a set of parameters that are personalized to the subject. For example, when biometric data includes data for mental fatigue, attention, and stress, the set of correlation coefficients may include a correlation coefficient for mental fatigue, a correlation coefficient for attention, and a correlation coefficient for stress. In some embodiments, the output may include a polynomial or other function that uses the correlation coefficients. Such a polynomial or other function may be used later to predict a subject's performance given skill level data and biometric data.

The operation may end after operation 350 or the operation may return to operation 302, at which point the training module 160 may repeat operations 302 through 350 with additional trial data.

In FIG. 3, the Readout Model is a process flow chart for predicting performance in accordance with an embodiment of the present invention. The process starts, and in operation 302, the state variable module 140 generates a state variable for a particular time (for the sake of convenience, this will be referred to herein as an n+1th trial, but is not limited to times immediately following the n trials used to train the system), and the prediction module 150 may also generate predicted biometrics for the n+1th trial by using the modulation parameters for that biometric to forecast the value at the n+1th timestep 322. The state variable module 140 may generate the state variable $e_{n+1}$ for the n+1th trial by progressing a cognitive model of state variables forward to time n+1 and extracting the skill level data $e_{n+1}$ generated by the state variable module 140 for time n+1. The cognitive model of state variables may be generated by the state variable module 140 using a subject's performance data and/or a general model of human performance. For example, the state variable module 140 may extrapolate the state variables generated for a subject to determine the state variable e at time n+1. The prediction module 150 may generate the predicted biometrics using a variety of methods. As mentioned above, the prediction module 322 may use the modulation value as a regression on each biometric type and progress the regression forward to a future time to identify a predicted biometric for each biometric type; or the prediction module may predict that the biometric data will be the same as the most recently generated biometric data (e.g., for the nth trial); or the prediction module may use biometric inputs based on its association with other data (e.g., use biometric inputs that are associated with a time of day that is similar to the time of day for the n+1th trial and/or use biometric inputs having values that are associated with a workload level that is similar to the workload level of the n+1th trial). The first method is our preferred implementation for 322. In operation 350, the prediction module uses the state variable generated for the n+1th trial, the predicted values of the biometrics a, s, and m for the n+1th trial, and the personalized parameters output by the training module 160 to generate a personalized behavioral prediction ($p_{n+1}$), using the trained Readout Model. The prediction module 150 may use the polynomial or other function that was generated by the training module 160 to generate the personalized performance prediction. In operation 350, the prediction module 150 may use a generalized linear model function to apply the GLM model to make a prediction about future performance. For example, the prediction module 150 may apply the most recent correlation coefficient for attention to the predicted value of the attention biometric (e.g., $a_{n+1}$), apply the most recent correlation coefficient for stress to the predicted value of the stress biometric (e.g., $s_{n+1}$), apply the most recent correlation coefficient for mental fatigue to the predicted value of the mental fatigue biometric (e.g., $m_{n+1}$), and extract the state variables (e.g., $e_{n+1}$) generated by the state variable module 140. These are supplied to the GLM model using a function such as glmval to compute, in conjunction with the link function, a prediction of performance at time n+1. For example, in one embodiment, the state variable $e_{n+1}$ is multiplied by a polynomial of the coefficients to compute a personalized performance prediction. In short, the personalized performance prediction may be calculated based on the predicted state variable $e_{n+1}$, the predicted biometrics (e.g., $a_{n+1}$, $s_{n+1}$, and $m_{n+1}$), and the polynomial or other function that is personalized to the subject by the trained correlation coefficients. As such, in operation 350, the Readout Model generates a prediction of the subject's ability to perform the task at a future time step ($p_{n+1}$) based on the outputs of the training module 160 and prediction module 150.

The computer system 120 may be connected to an automated system that is activated when the personalized behavioral prediction is below a threshold. In some embodiments, the computer system 120 may detect when the personalized behavioral prediction is below a threshold. Such a threshold may be a preset number and/or be calculated based on one or more preset rules. For example, a threshold may be a preset response time. The threshold may also be a response time that is calculated based on a preset formula. For example, the threshold response time may be calculated based on a distance between a subject and an identified hazard. The preset number and/or one or more preset rules may be stored in the computer system 120.

When the computer system 120 determines that the personalized behavioral prediction is below a threshold (in this case, that the subject is not likely to be able to react in time to avoid the hazard), the computer system 120 may activate the automated system to assist a subject in performing the task for which the personalized prediction was made. For example, when the personalized prediction exceeds a threshold (e.g., minimum) response time, the computer system 120 may activate an automated safety system in a vehicle that will assist the subject in avoiding a hazard on the road. In some embodiments, the automated system may be activated to provide a warning to the subject. Such a warning may provide the subject with information about the outputted personalized behavioral prediction. For example, the personalized prediction may be below a threshold when a subject is falling asleep. In such a scenario, the computer system 120 may activate an automated system in a vehicle to alert the subject to the subject's ability to operate the vehicle.

Figure 6:
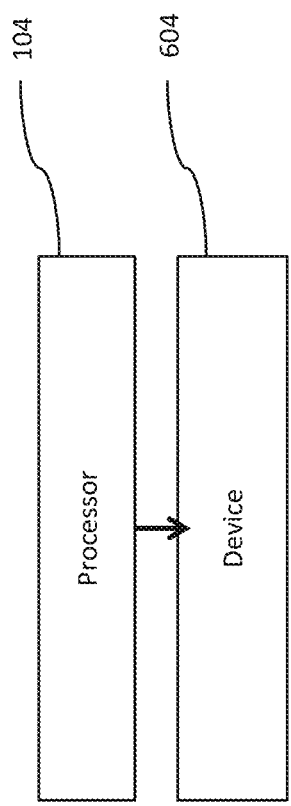
FIG. 6 is a block diagram depicting control of a device, according to various embodiments.

As shown in FIG. 6, a processor 104 may be used to control a device 604 (e.g., a ground or air passenger vehicle, a mobile device display, a virtual reality display, an augmented reality display, a computer monitor, a motor, a machine, a drone, a camera, etc.) based on an output of the systems and methods described above. For example, the processor 104 may be part of or controlled by the trigger 436 or the external/internal control system 438. In some embodiments, the control of the device 604 has a magnitude that is proportioned based on a subject's mental state score.

The control of the device 604 may be used to send at least one of a visual, audio, or electronic alert, such as regarding a user's lack of attention, fatigue above a threshold, or stress level above a threshold. For example, a visual alert may be a warning light, a message provided on a display, or an image of the detected object. An audible alert may be a tone or other sound. An electronic alert may be an email, text message, or social media message. In the case of an auditory warning, if a subject's mental state score indicates that the subject is only slightly inattentive, a more subtle warning such as a soft tone (e.g., a lower magnitude sound) may be used. The volume of the warning may increase (e.g., a larger magnitude sound) if the subject's mental score indicates that the subject's attention level is becoming very inattentive.

In other embodiments, the device 604 may be controlled to cause the device 604 to move or otherwise initiate a physical action (e.g., a maneuver) based on the output of the trigger 436. In some embodiments, an aerial or ground based vehicle (e.g., a passenger car, passenger plane, or drone) may be controlled to move and/or change movement. In other words, the device 604 may be or include an actuator or motor that is used to cause a vehicle, vehicle system, camera, sensor, or other machine to move or change its movement. If a user's mental state score indicates that the user is only slightly inattentive, vehicle controls may be limited to small lane keeping nudges (e.g., a smaller magnitude intervention) for steering. If a user's mental state score indicates that a user is very inattentive, vehicle controls may include braking and/or moving a vehicle to the side of the road (e.g., larger magnitude interventions) until the vehicle comes to a complete stop.

For example, for a driving system (e.g., the external/internal system 438), a combination of factors may be considered, such as lane-keeping performance and distance to the car in front compared to speed. If attention is high (e.g., above a threshold 434) but its correlation with task performance is below a threshold 434, the driver may be distracted and therefore it may be appropriate to disregard the high attention value when evaluating the driver's performance. In this situation, an autonomous system (e.g., the external/internal system 438) may need to take control the vehicle and/or alert the driver. Control of the vehicle may involve braking, accelerating to avoid a collision or obstacle, steering a vehicle, such as to avoid a collision or to move the vehicle to the roadside.

Alternatively, if the task performance is good but the attention biometric is low, the system may not need to take control and may not need to alert the driver, but the control system may increase the rate at which it monitors the surroundings (e.g., control of a device 604 increases a rate of sensor reading acquisition). Under these circumstances, the driver may be doing OK, but if a dangerous situation occurred the driver's reactions may be slow and the control system should step in. For a performance enhancement system, the biofeedback outputs would inform an intervention system (e.g., the external/internal system 438) that would decide how and when to intervene to improve performance, or might simply inform (e.g., through a visual or auditory notification) a subject who might improve their behavior as a result.

Figure 7:
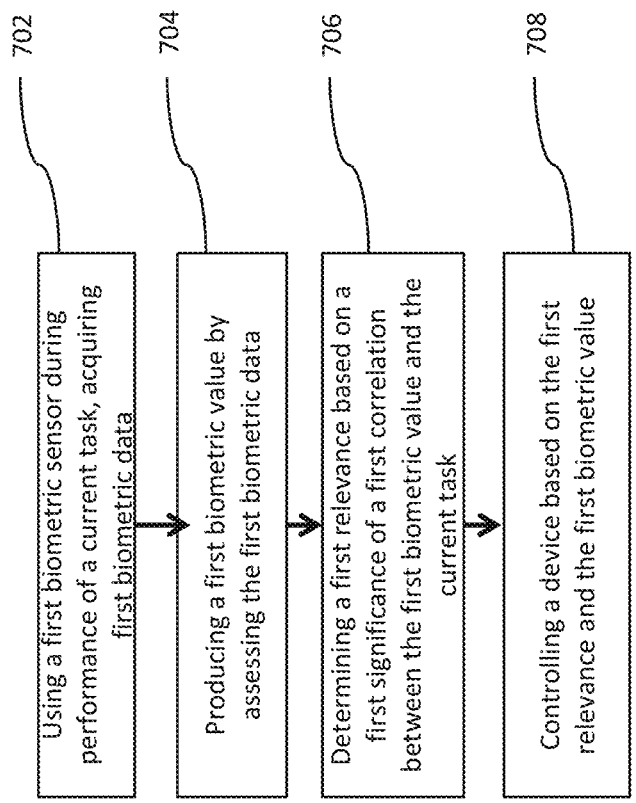
FIG. 7 a flowchart illustrating operations for predicting movement of an object, according to various embodiments.

FIG. 7 is a flowchart illustrating operations for biofeedback, according to an embodiment. In operation 702, using a first biometric sensor during performance of a current task, first biometric data is acquired. In operation 704, a first biometric value is produced by assessing the first biometric data. In operation 706, a first relevance is determined based on a first significance of a first correlation between the first biometric value and the current task. In operation 708, a device is controlled based on the first relevance and the first biometric value.

In some embodiments, if the first relevance (e.g., the output of operation 1012) is a "yes," then a device may be controlled, and the first biometric value (e.g., the output 1018) indicates the amount to which the biometric helps or hurts task performance. As discussed above, the devices and the type of control may depend on the system. For example, for a relevant low attention determination during operation of a vehicle, control of the device may be a predetermined operation, such as triggering an audible or visual alert to the driver to help them pay attention to driving the vehicle. The volume may be proportioned based on the degree to which the threshold has been crossed. For example, for moderately low attention, a displayed reminder may appear on a screen or on a light without using an auditory tone. For a large drop in attention, a loud noise or audio recording may be used to get the driver to pay attention to the road. In other words, if the relevance condition (e.g. yes) and a biometric condition (e.g., a biometric value crossed a threshold) a predetermined device control response (e.g., turning on a light, an audio recording, or a braking/maneuvering sequence of commands) may be triggered, such as by referring to a lookup table.

In an embodiment, where the "device" is a semi-autonomous automobile driver assistance system that needs to take over the control of the vehicle if the human driver is unable to drive, or is preoccupied (e.g. with texting or a distraction), then the system may provide a current value for each biometric, informing the driver assistance device the amount to which the current value of each biometric matters in terms of the driver's ability to drive the car (his performance), and if the slope is non-zero, whether the biometric helps or hurts his/her performance.

In some embodiments, the system uses an average or other combination of multiple signals. For example, a driver assistance system may take control of a car, or begin to assist a driver, if the average slope of all biometrics is <0. For example might be if attention is low (e.g., 0.25 or less on a normalized attention scale) and fatigue is high (e.g., at or greater than 0.75 on a normalized fatigue scale), and these are relevant to driving performance, then the driver may not be doing a good job and is at risk of an accident. In this example, stress may be considered irrelevant, but may be considered relevant to driving in other example embodiments. In this example, if the slopes are $CA=0.20$, $CS=0$, $CM=-0.33$ and the biometric effects may be given by (0.25*0.2), 0, and (0.75*-0.33) for attention, stress, and fatigue, respectively. The average of these biometric effects is then −0.09875, which is less than 0 and which indicates that the driver in this case may not be doing a good job and is at risk of an accident. If the average slope is >=0, then the driver may be determined to be fully capable of driving safely, and other considerations might govern the decision of whether the assistance system should take over control.

As such, embodiments of the present invention allow for improvement of prediction models based on sensor readings of biometric data from a subject. Such improvements yield predictions that are more accurate in real-life scenarios, where the subject's performance can be the outcome of a complex interaction amongst a myriad of internal and external influences. Furthermore, because such improvements allow for the customization of prediction models based on various scenarios for different subjects, the versatility of such prediction models also increases.

Figure 8:
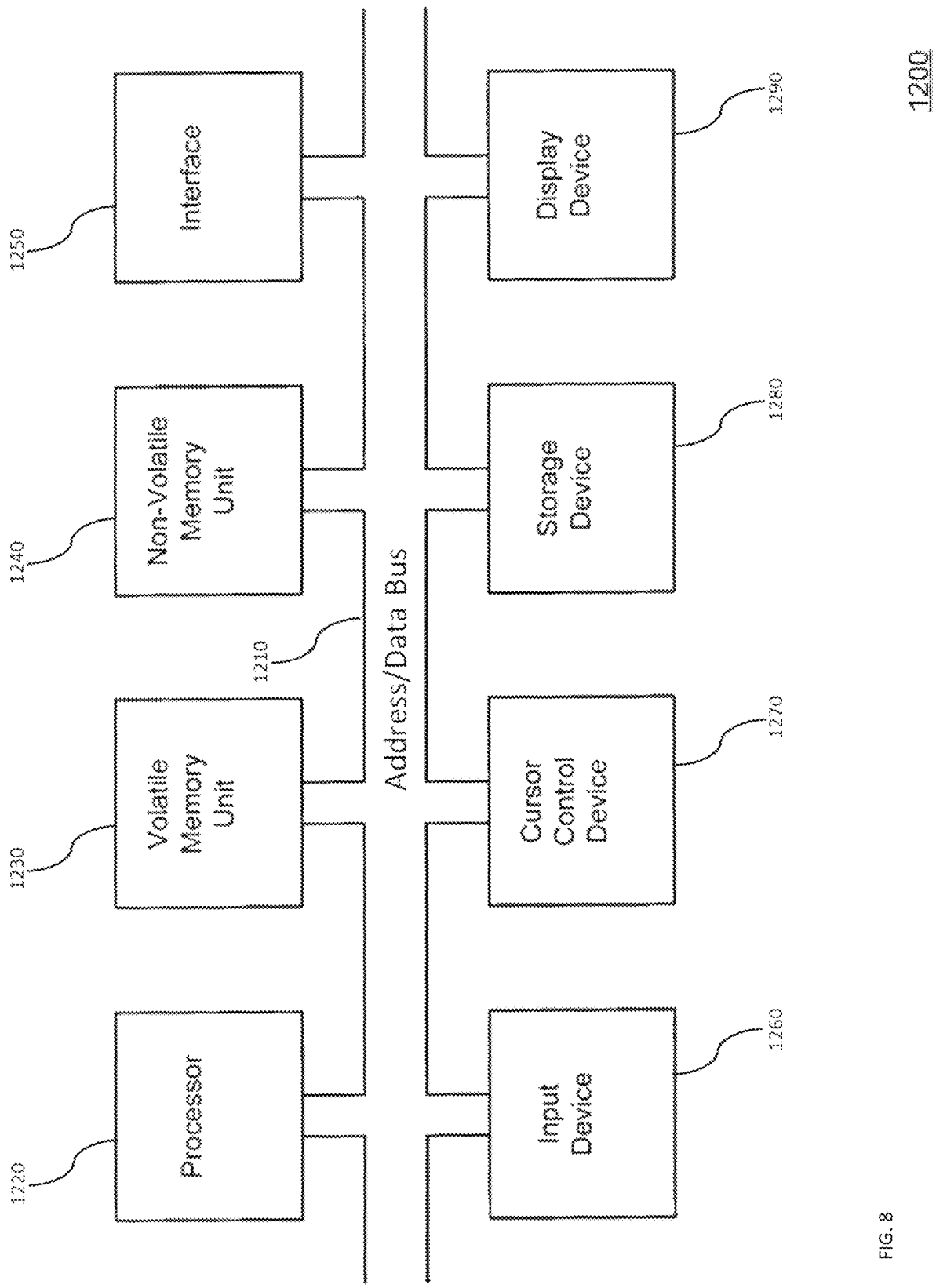
FIG. 8 is a block diagram of an exemplary computer system in accordance with an embodiment of the present invention.

FIG. 8 is a block diagram of an exemplary computer system 1200 in accordance with an embodiment, which, in some embodiments of the present invention, may be used to implement the computer system 120 described above. Exemplary computer system 1200 is configured to perform calculations, processes, operations, and/or functions associated with a program or algorithm. In one embodiment, certain processes and operations discussed herein are realized as a series of instructions (e.g., software program) that reside within computer readable memory units and are executed by one or more processors of exemplary computer system 1200. When executed, the instructions cause exemplary computer system 1200 to perform specific actions and exhibit specific behavior, such as described herein.

Exemplary computer system 1200 may include an address/data bus 1210 that is configured to communicate information. Additionally, one or more data processing units, such as processor 1220, are coupled with address/data bus 1210. Processor 1220 is configured to process information and instructions. In an embodiment, processor 1220 is a microprocessor. Alternatively, processor 1220 may be a different type of processor such as a parallel processor or a field programmable gate array.

Exemplary computer system 1200 is configured to utilize one or more data storage units. Exemplary computer system 1200 may include a volatile memory unit 1230 (e.g., random access memory ("RAM"), static RAM, dynamic RAM, etc.) coupled with address/data bus 1210, wherein volatile memory unit 1230 is configured to store information and instructions for processor 1220. Exemplary computer system 1200 further may include a non-volatile memory unit 1240 (e.g., read-only memory ("ROM"), programmable ROM ("PROM"), erasable programmable ROM ("EPROM"), electrically erasable programmable ROM ("EEPROM"), flash memory, etc.) coupled with address/data bus 1210, wherein non-volatile memory unit 1240 is configured to store static information and instructions for processor 1220. Alternatively, exemplary computer system 1200 may execute instructions retrieved from an online data storage unit, such as in "Cloud" computing. In an embodiment, exemplary computer system 1200 also may include one or more interfaces, such as interface 1250, coupled with address/data bus 1210. The one or more interfaces are configured to enable exemplary computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, exemplar computer system 1200 may include an input device 1260 coupled with address/data bus 1210, wherein input device 1260 is configured to communicate information and command selections to processor 1220. In accordance with one embodiment, input device 1260 is an alphanumeric input device, such as a keyboard, that may include alphanumeric and/or function keys. Alternatively, input device 1260 may be an input device other than an alphanumeric input device. In an embodiment, exemplar computer system 1200 may include a cursor control device 1270 coupled with address/data bus 1210, wherein cursor control device 1270 is configured to communicate user input information and/or command selections to processor 1220. In an embodiment, cursor control device 1270 is implemented using a device such as a mouse, a track-ball, a track-pad, an optical tracking device, or a touch screen. The foregoing notwithstanding, in an embodiment, cursor control device 1270 is directed and/or activated via input from input device 1260, such as in response to the use of special keys and key sequence commands associated with input device 1260. In an alternative embodiment, cursor control device 1270 is configured to be directed or guided by voice commands.

In an embodiment, exemplary computer system 1200 further may include one or more optional computer usable data storage devices, such as storage device 1280, coupled with address/data bus 1210. Storage device 1280 is configured to store information and/or computer executable instructions. In one embodiment, storage device 1280 is a storage device such as a magnetic or optical disk drive (e.g., hard disk drive ("HDD"), floppy diskette, compact disk read only memory ("CD-ROM"), digital versatile disk ("DVD")). Pursuant to one embodiment, a display device 1290 is coupled with address/data bus 1210, wherein display device 1290 is configured to display video and/or graphics. In an embodiment, display device 1290 may include a cathode ray tube ("CRT"), liquid crystal display ("LCD"), field emission display ("FED"), plasma display, or any other display device suitable for displaying video and/or graphic images and alphanumeric characters recognizable to a user.

Exemplary computer system 1200 is presented herein as an exemplary computing environment in accordance with an embodiment. However, exemplary computer system 1200 is not strictly limited to being a computer system. For example, an embodiment provides that exemplary computer system 1200 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology are controlled or implemented using computer-executable instructions, such as program modules, being executed by a computer. In one exemplary implementation, such program modules include routines, programs, objects, components, and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Embodiments are provided to fully disclose the invention to those skilled in the art to which the invention pertains, and the scope of the invention should be understood by the claims of the invention. Accordingly, it will be understood by those of skill in the art that various changes in form and details may be made without departing from the spirit and scope of the invention as set forth in the following claims. Therefore, the technical range of the present invention is not limited to the detailed description of the specification but defined by the range of the claims and their functional equivalents.

What is claimed is:

1. A method comprising:
receiving, by a processor, performance data corresponding to a performance of a task comprising controlling a vehicle;
receiving, by the processor, a plurality of biometric inputs computed based on physiological data sensed by a first plurality of sensors during the performance of the task;
identifying, by the processor, a numerical relationship between the performance data and the plurality of biometric inputs;
generating, by the processor, a modulation parameter for each of the plurality of biometric inputs based on the identified numerical relationship;
loading, by the processor, a plurality of state variable inputs produced by a generic model of performance;
preparing, by the processor, a training set, wherein the training set includes performance data, the plurality of state variable inputs, the plurality of biometric inputs, and the modulation parameter for each of the plurality of biometric inputs;
training, by the processor, a machine learning model based on the training set to generate a trained performance predictor;
receiving, by the processor:
the trained performance predictor;
biometric inputs predicted by following the slope and intercept of each modulation parameter to a prediction time; and
cognitive model state variable predictions made by progressing the model forward to the prediction time;
generating, by the processor, a prediction of ability to perform the task at the prediction time, generated by the trained performance predictor based on the predicted biometric inputs;
determining, by the processor, that the ability to perform the task is below a threshold level; and
activating, by the processor, an automated system configured to directly control the vehicle to change movement in response to determining that the ability to perform the task is below the threshold level.

2. The method of claim 1, wherein each of the plurality of state variable inputs is indicative of a skill level in the performance of the task.

3. The method of claim 1, wherein the task is operating an aerospace vehicle.

4. The method of claim 1, wherein the task is operating a semi-autonomous vehicle.

5. The method of claim 1, wherein the task is performed on a training simulator.

6. The method of claim 1, further comprising:
detecting, by the processor, that the prediction of ability to perform the task in the future time step is below a threshold; and
activating, by the processor, the automated system to assist in performing the task in response to determining that the prediction of ability to perform the task in the future time step is below the threshold.

7. The method of claim 1, wherein the first plurality of sensors are configured to capture environmental data sensed in a region of where the task is performed and biometric data.

8. The method of claim 1, wherein the performance data and the physiological data are captured within a plurality of time windows, each of the plurality of time windows corresponding to one of a plurality of trials involving the task.

9. The method of claim 8, wherein, for each of the plurality of trials, a mean is calculated for the plurality of biometric inputs over the corresponding time window, the mean being used to identify the numerical relationship used in the training set, and used to identify the numerical relationship.

10. The method of claim 9, wherein the corresponding time window over which the mean is calculated is different for each of the plurality of biometric inputs.

11. The method of claim 1, wherein each of the plurality of biometric inputs corresponds to a time window of a plurality of time windows, the time window starting before a prompt for the task is presented.

12. The method of claim 1, further comprising:
receiving, by a processor, a plurality of environmental sensor inputs from a second plurality of sensors, the plurality of environmental sensor inputs being captured during the performance of the task, wherein the modulation parameters encode the numerical relationship from the plurality of state variable inputs, the plurality of biometric inputs, and the plurality of environmental sensor inputs to the performance data.

13. A system for generating a prediction of a level of performance of a task in a future time step, the system comprising:
a computer system comprising of one or more processors and a memory;
a user input system in communication with the computer system; and
a plurality of sensors configured to measure physiological data, wherein the plurality of sensors are in communication with the computer system,
wherein the memory comprises a non-transitory computer-readable medium having executable instructions encoded thereon, such that upon execution of the instructions, the one or more processors perform operations of:
receiving, by a processor, performance data corresponding to the level of performance of a task comprising controlling a vehicle;
receiving, by the processor, a plurality of biometric inputs computed based on physiological data sensed by the plurality of sensors during the performance of the task;
identifying, by the processor, a numerical relationship between the performance data and the plurality of biometric inputs;
generating, by the processor, a modulation parameter for each of the plurality of biometric inputs based on the identified numerical relationship;

loading, by the processor, a plurality of state variable inputs produced by the performance data and a general model of performance;

preparing, by the processor, a training set, wherein the training set includes performance data, the plurality of state variable inputs, the plurality of biometric inputs, and the modulation parameter for each of the plurality of biometric inputs;

training, by the processor, a machine learning model based on the training set to generate a trained performance predictor;

receiving, by the processor:
- the trained performance predictor;
- biometric inputs predicted by following the slope and intercept of each modulation parameter to a prediction time; and
- cognitive model state variable predictions made by progressing the model forward to the prediction time;

generating, by the processor, a prediction of ability to perform the task at the prediction time, generated by the trained performance predictor based on the predicted biometric inputs;

determining, by the processor, that the ability to perform the task is below a threshold level; and activating, by the processor, an automated system configured to directly control the vehicle to change movement in response to determining that the ability to perform the task is below the threshold level.

14. The system of claim 13, wherein the plurality of sensors sense physiological data during the performance of the task.

15. The system of claim 13, wherein the plurality of sensors sense and detect data from an environment during the performance of the task.

16. A non-transitory computer readable medium containing program instructions that, when executed by a processor, cause the processor to generate a prediction of ability to perform a task in a future time step by:

receiving, by the processor, performance data corresponding to a level of performance of the task;

receiving, by the processor, a plurality of biometric inputs computed based on physiological data sensed by a first plurality of sensors during the performance of the task;

identifying, by the processor, a numerical relationship between the performance data and the plurality of biometric inputs;

generating, by the processor, a modulation parameter for each of the plurality of biometric inputs based on the identified numerical relationship;

loading, by the processor, a plurality of state variable inputs produced by the performance data and a general model of performance;

preparing, by the processor, a training set, wherein the training set includes performance data, the plurality of state variable inputs, the plurality of biometric inputs, and the modulation parameter for each of the plurality of biometric inputs;

training, by the processor, a machine learning model based on the training set to generate a trained performance predictor;

receiving, by the processor:
- the trained performance predictor;
- biometric inputs predicted by following the slope and intercept of each modulation parameter to a prediction time; and
- cognitive model state variable predictions made by progressing the model forward to the prediction time;

generating, by the processor, the prediction of ability to perform the task at the prediction time, generated by the trained performance predictor based on the predicted biometric inputs;

determining, by the processor, that the ability to perform the task is below a threshold level; and activating, by the processor, an automated system configured to directly control a vehicle to change movement in response to determining that the ability to perform the task is below the threshold level.

* * * * *